US011126245B2

(12) United States Patent
Madigan et al.

(10) Patent No.: US 11,126,245 B2
(45) Date of Patent: Sep. 21, 2021

(54) DEVICE, SYSTEM AND METHOD TO DETERMINE A POWER MODE OF A SYSTEM-ON-CHIP

(71) Applicant: Intel Corporation, Santa Clara, CA (US)

(72) Inventors: Justin Madigan, Folsom, CA (US); Shaun M. Conrad, El Dorado Hills, CA (US); Christopher J. Lake, Folsom, CA (US); Madhu Thangaraj, Folsom, CA (US); Dhinesh Sasidaran, Bayan Lepas (MY); Jared W. Havican, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 16/448,797

(22) Filed: Jun. 21, 2019

(65) Prior Publication Data

US 2020/0401205 A1     Dec. 24, 2020

(51) Int. Cl.
   *G06F 1/3234*     (2019.01)

(52) U.S. Cl.
   CPC ................... *G06F 1/3234* (2013.01)

(58) Field of Classification Search
   CPC .................................................... G06F 1/3234
   See application file for complete search history.

(56) References Cited

U.S. PATENT DOCUMENTS

2002/0184547 A1\* 12/2002 Francis ................. G06F 1/3237
                                                                713/322
2005/0273290 A1   12/2005 Asano et al.
2007/0085583 A1\* 4/2007 Zohar ................. H03K 19/0016
                                                                327/178
2008/0104430 A1   5/2008 Malone et al.
2008/0109665 A1\* 5/2008 Kuhlmann ............ G06F 1/3203
                                                                713/300

(Continued)

FOREIGN PATENT DOCUMENTS

KR       20130034049        4/2013
WO       20110022859        1/2011

OTHER PUBLICATIONS

International Search Report & Written Opinion notified Aug. 27, 2020 for PCT Patent Application No. PCT/US2020/033435.

*Primary Examiner* — Vincent H Tran
(74) *Attorney, Agent, or Firm* — Green, Howard & Mughal LLP

(57) ABSTRACT

Techniques and mechanisms for identifying a power state to be provided with an integrated circuit (IC). In an embodiment, evaluator circuitry of a system-on-chip is programmable based on multiple criteria which are each for a different respective power mode. Programming of the evaluator circuitry enables concurrent evaluations each to determine, for a different respective power mode, whether a detected state of the IC is able to accommodate said power mode. Results of the evaluations are communicated, in parallel with each other, to circuitry which selects one such power mode based on relative priorities of the power modes with respect to each other. In another embodiment, the evaluator circuitry comprises an array of circuit cells which are configurable each to perform a different respective evaluation based on a corresponding combination of a test condition and a detected condition of the IC.

17 Claims, 9 Drawing Sheets

(56) References Cited

U.S. PATENT DOCUMENTS

| | | | |
|---|---|---|---|
| 2008/0229130 A1* | 9/2008 | Guan | G06F 1/3237 |
| | | | 713/323 |
| 2010/0031067 A1* | 2/2010 | Arsovski | G06F 1/26 |
| | | | 713/300 |
| 2010/0115304 A1* | 5/2010 | Finkelstein | G06F 1/26 |
| | | | 713/320 |
| 2011/0022870 A1 | 1/2011 | McGrane et al. | |
| 2013/0054886 A1* | 2/2013 | Eshraghian | G11C 13/0007 |
| | | | 711/108 |
| 2013/0311796 A1* | 11/2013 | Brinks | G06F 1/3296 |
| | | | 713/300 |
| 2013/0346766 A1* | 12/2013 | Tani | G06F 1/329 |
| | | | 713/300 |
| 2015/0109051 A1* | 4/2015 | Lam | G06F 1/26 |
| | | | 327/540 |
| 2015/0206682 A1* | 7/2015 | Sala | G06F 1/3287 |
| | | | 307/112 |
| 2016/0026498 A1* | 1/2016 | Song | G06F 1/03 |
| | | | 712/205 |
| 2016/0091957 A1* | 3/2016 | Partiwala | G11C 7/1072 |
| | | | 713/323 |
| 2016/0378168 A1* | 12/2016 | Branover | G06F 1/3243 |
| | | | 713/323 |
| 2017/0010646 A1* | 1/2017 | Takayanagi | G06F 1/3296 |
| 2017/0244825 A1* | 8/2017 | Li | G06F 1/1635 |
| 2017/0371395 A1* | 12/2017 | Saeki | G06F 15/17318 |
| 2018/0173538 A1* | 6/2018 | Muralidhar | G06F 9/4411 |
| 2019/0033931 A1* | 1/2019 | Yanggong | G06F 1/3296 |
| 2020/0058330 A1* | 2/2020 | Chhabra | G11C 11/4076 |

* cited by examiner

DEVICE, SYSTEM AND METHOD TO DETERMINE A POWER MODE OF A SYSTEM-ON-CHIP

BACKGROUND

1. Technical Field

This disclosure generally relates to power management for an integrated circuit and more particularly, but not exclusively, to the identification of a power state to be provided with a system-on-chip.

2. Background Art

In a system-on-chip (SOC), circuit components of the SOC are integrated on a single chip. SOC integrated circuits are becoming ever more popular in various applications including embedded applications such as with set-top-boxes, mobile phones, portable media devices, and so on. While the high integration of components in a SOC provides advantages such as chip area savings and better signal quality, power consumption and performance latency are becoming increasingly important constraints for devices that include such SOCs. Especially with portable SOC applications, efficient power management functionality is a valuable aspect of many SOC implementations.

With successive generations of integrated circuit technologies, the number, variety, and capabilities of SOCs continue to grow. As a result, there is expected to be an increasing premium placed on incremental improvements to how power efficiencies are provided by next-generation SOCs, and by SOCs which are already in use.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
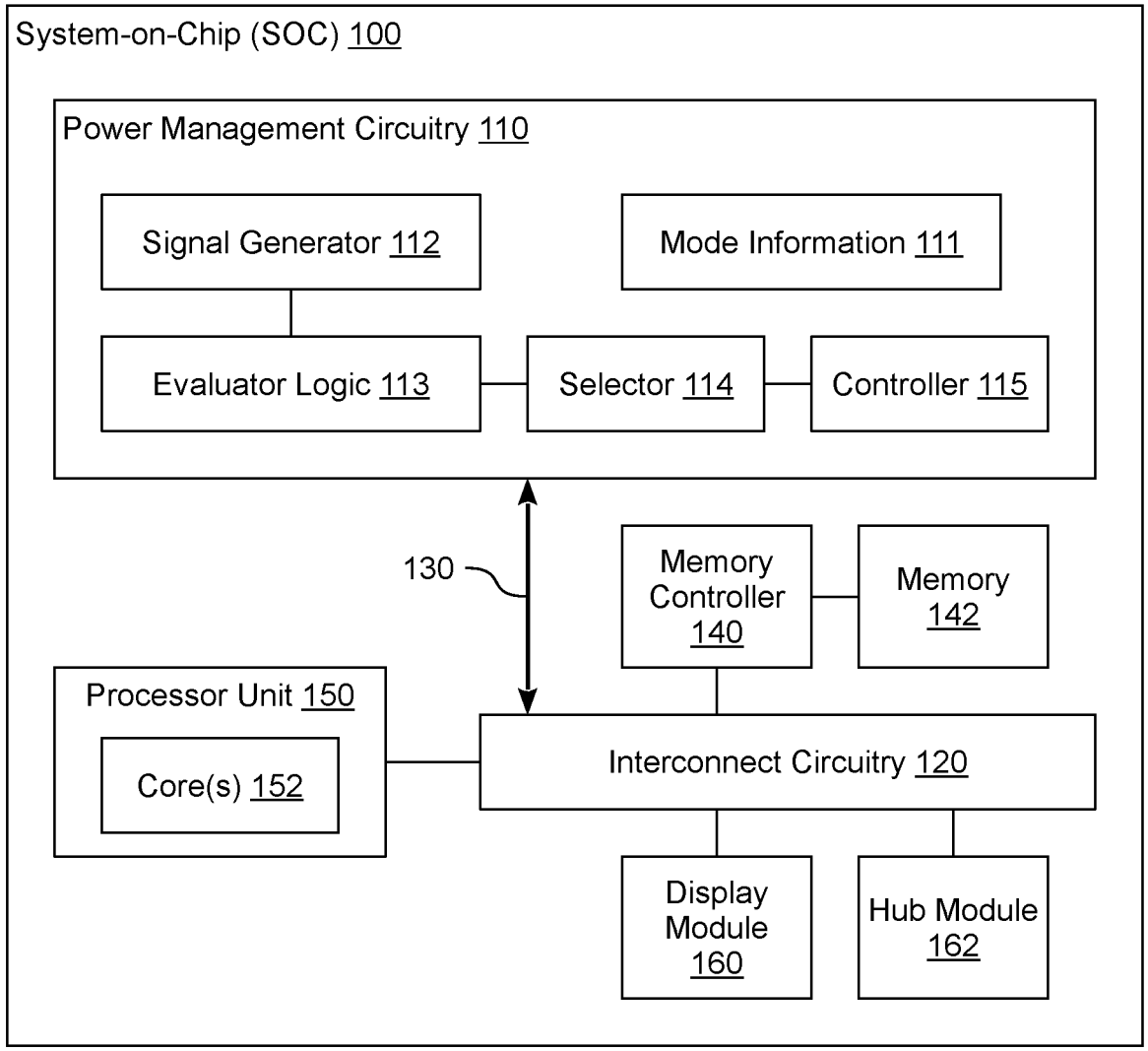
FIG. 1 illustrates a functional block diagram showing elements of a system-on-chip to provide power management at a system-on-chip according to an embodiment.

Embodiments described herein variously provide techniques and mechanisms for identifying a power state to be provided with integrated circuitry. In an embodiment, the identifying is based on evaluations which each determine, for a different respective power mode, whether a detected state of the integrated circuitry is able to accommodate said power mode.

For example, the evaluations are performed with power management circuitry which is programmable (or otherwise configurable) based on multiple criteria each for a different respective power mode. In some embodiments, such power management circuitry is reconfigurable—e.g., to accommodate use as a component in any of various types of SOCs and/or to accommodate updates to the available power modes for a given SOC.

By way of illustration and not limitation, a programming of such power management circuitry enables a concurrent performance of multiple evaluations that are based each on a different respective criterion of the multiple criteria. In various embodiments, results of such multiple evaluations are communicated, in parallel with each other, to circuitry which selects a power mode from among one or more candidate power modes. Such selection is based, for example, on predefined relative priorities of the candidate power modes with respect to each other.

Various traditional power management techniques rely on high-level software selection of a power state. Power state durations and transitions are often time constrained due to latencies associated with such software solutions. Also, software-based power management often requires a static set of input conditions. This invention mitigates such disadvantages by providing power management functionality with configurable hardware that accommodates changes to reference information for use in determining a power state.

Certain features of various embodiments are described herein with reference to the identification of a power state which is to be configured at a SOC. However, such description may be extended to additionally or alternatively apply to a power state which is to be configured at any of various other types of integrated circuits. Unless otherwise indicated, the term "detected condition" refers herein to a condition of a SOC (or other integrated circuitry)—e.g., wherein a detected state of the SOC comprises multiple detected conditions. By contrast, a "test condition" refers herein to a basis for evaluating a corresponding detected condition. For example, in some embodiments, evaluating whether a state of an SOC (or "SOC state") satisfies a given criterion includes determining whether a detected condition of the SOC state satisfies a corresponding test condition of said criterion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices which include a system-on-chip.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker to indicate a greater number of constituent signal paths, and/or have arrows at one or more ends to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e., scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking, or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

It is pointed out that those elements of the figures having the same reference numbers (or names) as the elements of any other figure can operate or function in any manner similar to that described, but are not limited to such.

FIG. 1 illustrates elements of a system-on-chip (SOC) 100 which provides a programmable power management functionality according to certain embodiments. SOC 100 is merely one example of an integrated circuit (IC) chip that determines a power mode for multiple components (also referred to herein as "functional blocks") which have various respective power utilization characteristics that change over time. Such an IC chip further comprises circuitry to determine whether, at a given time, these power utilization characteristics necessitate (or otherwise allow for) a transition of the SOC from a currently-configured power mode to a different power mode.

In an embodiment, SOC 100 supports operation as a component of a desktop computer, laptop computer, handheld device (e.g., a smart phone, palmtop device, tablet, etc.), gaming console, wireless communication device, or other such computing-capable device. To facilitate such operation, SOC 100 comprises multiple functional blocks which, at different times, exhibit various respective power consumption requirements, power reduction margins and/or other such power utilization characteristics. In the example embodiment shown, such functional blocks comprise a processor unit 150 (including one or more processor cores 152), a memory controller 140, a memory 142, interconnect circuitry 120, a display module 160, and a hub module 162. However, some embodiments are not limited with respect to the particular number or configuration of functional blocks for which power management is provided at a SOC. For example, in other embodiments, power management is provided for more, fewer and/or differently configured functional blocks of SOC 100.

Interconnect circuitry 120 couples various functional blocks of SOC 100 to circuit logic of SOC 100 (such as the illustrative power management circuitry 110 shown) which is to determine a power state of SOC 100. Interconnect circuitry 120 includes any of a variety of one or more busses, crossbars, fabrics and/or other connection mechanisms to variously couple one or more functional blocks of SOC 100 to power management circuitry 110. For example, interconnect circuitry 120 facilitates communication of control signals from power management circuitry 110 each to a respective functional block, where said control signals variously configure respective operational parameters of a given power mode. Alternatively or in addition, interconnect circuitry 120 facilitates communication of one or more sensor signals each from a respective functional block to power management circuitry 110. Such one or more sensor signals facilitate the identification of a next power state of SOC 100, for example. In some embodiments, interconnect circuitry 120 further facilitates communication between various functional blocks via one or more paths which are independent of power management circuitry 110.

In an example embodiment, processor unit 150 is operable to execute a Basic Input/Output System (BIOS), an operating system (OS) and/or any of various other software processes—e.g., by accessing instructions stored in memory 142 or in a separate storage device. For example, the one or more cores 152 provide functionality to execute an OS which is to variously send to memory controller 140 requests to read data from, and/or write data to, access memory 142.

During operation of SOC 100, memory controller 140 provides processor unit 150 with access to memory 142, such as a dynamic random access memory (DRAM). Operation of memory 142 and memory controller 140 conform, for example, to some or all requirements of a dual data rate (DDR) specification such as the DDR Four (DDR4) Synchronous DRAM (SDRAM) specification JESD79-4B, published June, 2017 by the JEDEC Solid State Technology Association of Arlington, Va., a high bandwidth memory (HBM) specification such as the HBM DRAM Standard JESD235, October 2013, or other such specification.

Display module 160 is operable to perform image data processing and hub module 162 to serve as a hub for of one or more other components (not shown) of SOC 100. Hub module 162 comprises a platform hub, an input/output (I/O) hub or other such hub circuitry, for example. In one such embodiment, display module 160 and/or hub module 162 access memory 142 at various times via memory controller 140—e.g., where such access is supported by a given power state of SOC 100.

For example, SOC 100 operates at different times in any of two or more power states, and provides power management circuitry 110 to support, initiate, or otherwise implement transitions between such power states. According to one exemplary embodiment, power management circuitry 110 comprises circuit logic (represented by the illustrative signal generator 112 and evaluator logic 113 shown) to identify a given power state which is to be configured for SOC 100. Such identifying is based in part on an operational state of SOC 100—e.g., including a state of current and/or expected future operation of one or more functional blocks of SOC 100.

In an embodiment, power management circuitry 110 is programmable to be provided with a configuration state that determines at least in part how communications and/or other operations are to be performed to identify a next power state for SOC 100. Providing such a configuration state includes power management circuitry 110 receiving, or otherwise being programmed based on, configuration information (e.g., including the illustrative mode information 111 shown) which determines at least in part how information is to be communicated, evaluated and/or otherwise used to identify a power mode based on a detected state of one or more functional blocks.

In an embodiment, configuration state such as that illustrated by mode information 111 specifies or otherwise indicates various criteria which each correspond to a different respective power mode of multiple possible power modes for SOC 100. For example, in some embodiments, a given criteria for a corresponding power mode includes one or more test conditions. At a given time, an ability of SOC 100 to accommodate the corresponding power mode is indicated where, for example, power management circuitry 110 determines that each of said one or more test conditions is satisfied by an indicated state of the one or more functional blocks.

By way of illustration and not limitation, power management circuitry 110 comprises evaluator logic 113 which is coupled to receive, or otherwise be programmed based on, multiple criteria which each correspond to a different respective power mode. Such configuration of power management circuitry 110 is performed, for example, with a BIOS process or any of various other suitable mechanisms. In an embodiment, the BIOS performs one or more operations that, for example, are adapted from conventional techniques for providing configuration information during a boot-up or other suitable process. The configuration of power management circuitry 110 with the multiple criteria enables evaluator logic 113 to perform comparisons and/or other operations which facilitate a determination as to which power modes (if any), other than a current power mode, are accommodated by an indicated state of SOC 100.

For example, while evaluator logic 113 is so configured, power management circuitry 110 operates to monitor a state of one or more functional blocks of SOC 100. In the example embodiment shown, a signal generator 112 of power management circuitry 110 is coupled to receive one or more signals—e.g., via interconnect 130 and/or other such interconnect structures—each from a respective sensor (not shown) of SOC 100. Based on information indicated by such sensor signals, circuitry of signal generator 112 generates corresponding signals to be communicated to evaluator logic 113—e.g., where a format of such signals is to accommodate the programmed configuration of evaluator logic 113. In some embodiments, configuration of power management circuitry 110 based on mode information 111 additionally or alternatively comprises signal generator 112 receiving or otherwise being programmed based on information (referred to herein as "signal generation information") which specifies or otherwise indicates a format of signals to be communicated from signal generator 112 to evaluator logic 113.

Based on signals from signal generator 112 (the signals indicating a current or expected future state of SOC 100), evaluator logic 113 performs multiple evaluations which each correspond to a different respective power mode. For example, each such evaluation is to determine whether the detected state of SOC 100 (as indicated by the signals from signal generator 112) accommodates the corresponding power mode. In some embodiments, the multiple evaluations are performed concurrently with evaluator logic 113. For example, in an embodiment, various circuits of evaluator logic 113 are coupled to receive the same signals from signal generator 112, to concurrently perform respective evaluations of said signals, and to output respective results of said evaluations—e.g., where the results are communicated from evaluator logic 113 in parallel with each other.

In an embodiment, a selector 114 of power management circuitry 110 is coupled to receive evaluation results from evaluator logic 113 and to identify (based on said results) a next power state to be configured for SOC 100. For example, selector 114 determines which of the multiple possible power modes (if any) have been determined by evaluator logic 113 to be what is referred to herein as "candidate power modes"—i.e., power modes which could be accommodated by a recently detected state of SOC 100. Selector 114 performs a selection from among the one or more candidate power modes—e.g., where such selection is based on a predefined relative priorities of said power modes. In some embodiments, configuration of power management circuitry 110 additionally or alternatively comprises selector 114 receiving or otherwise being programmed based on information (referred to herein as "rank information") which indicates such relative priorities of the power modes with respect to each other.

In an embodiment, a controller 115 of power management circuitry 110 is coupled to receive from selector 114 a signal which identifies the power mode which has been selected from among the one or more candidate power modes. Based on such a signal, controller 115 communicates one or more control signals to transition power management circuitry 110 from a current power mode to the selected power mode. Such control signaling is communicated, for example, via interconnect 130, interconnect circuitry 120 and/or other such interconnect structures to various functional blocks of SOC 100.

For example, controller 115 includes or otherwise has access to reference information (referred to herein as "mode parameter information") which specifies or otherwise indicates respective setting (for a given power mode) of one or more operational parameter of SOC 100. In some embodiments, such mode parameter information further specifies or otherwise indicates a particular sequence according to which such operational parameters are to be modified to transition to the power mode. In one such embodiment, configuration of power management circuitry 110 additionally or alternatively comprises controller 115 receiving or otherwise being programmed based on such mode parameter information.

In one illustrative embodiment, control signals generated by controller 115 cause one or more functional blocks of SOC 100 to perform clock gating, power gating, selectively enabling/disabling voltage supply circuitry and/or any of various other power management operations—e.g., including one or more operations that (for example) are adapted from conventional power management mechanisms and techniques. The particular number, type and/or order of power mode transition actions performed in response to such control signals are not limiting on some embodiments.

Figure 2:
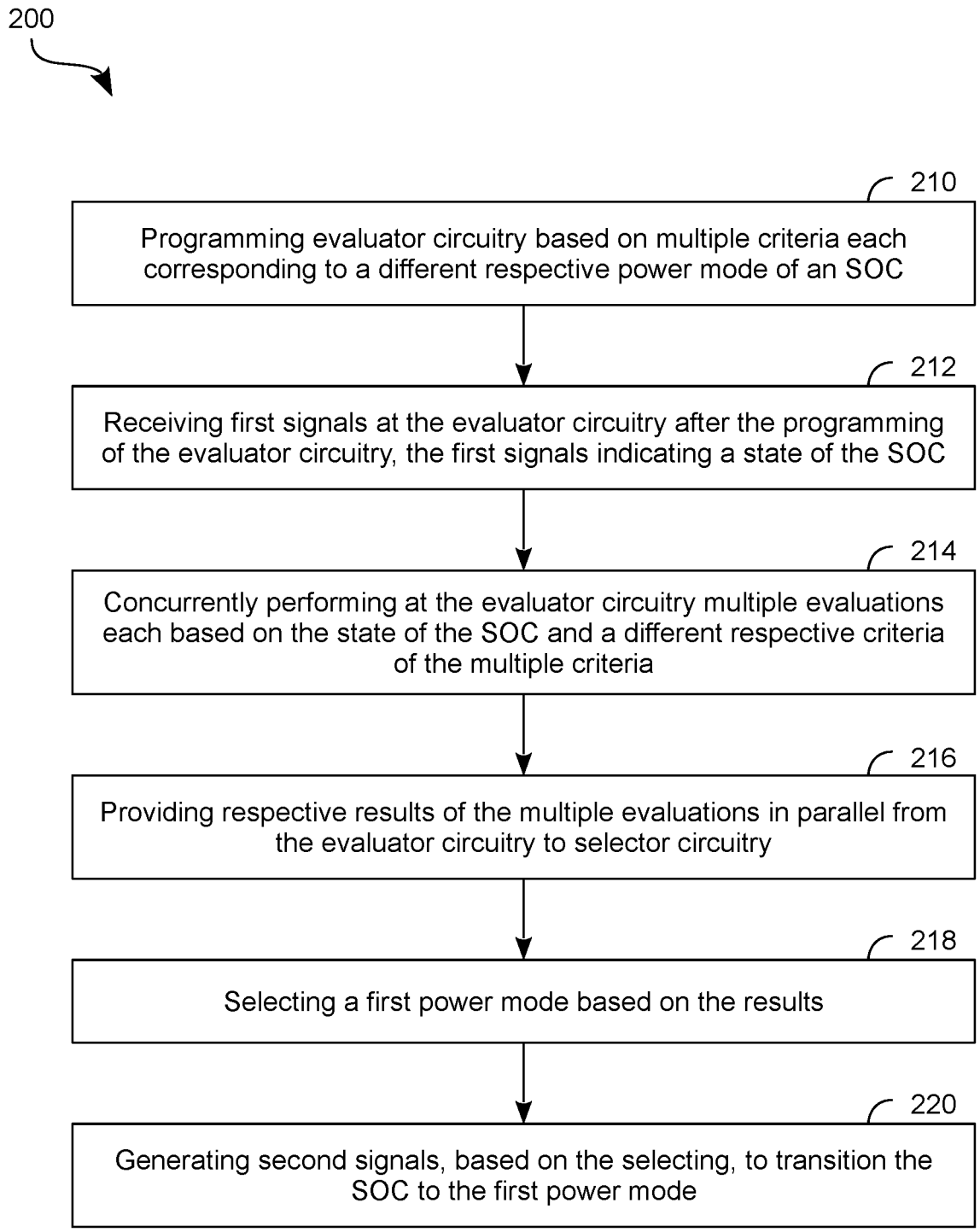
FIG. 2 illustrates a flow diagram showing elements of a method for determining a power mode to be configured according to an embodiment.

FIG. 2 shows features of a method 200 for determining a power mode to be configured according to an embodiment. Method 200 is one example of an embodiment wherein circuit logic of a SOC concurrently performs multiple evaluations—based on a programmed configuration of said circuit logic—which each determine, according to a respective criterion, whether a detected state of the SOC accommodates a corresponding power mode. Method 200 is performed with circuitry of SOC 100 (e.g., with power management circuitry 110), for example.

As shown in FIG. 2, method 200 includes (at 210) programming evaluator circuitry of a SOC based on multiple criteria which each correspond to a different respective power mode of multiple possible power modes of the SOC. In an embodiment, the programming at 210 is based on information which specifies or otherwise indicates criteria which each include a respective one or more test conditions. For example, for a given one of such one or more test conditions, the evaluator circuitry is programmed at 210 to include or otherwise have access to one or more parameters of the test condition. In various embodiments, such one or more parameters include a minimum threshold value, a maximum threshold value, and/or a single-bit value which is to be a basis for a Boolean evaluation (if any) of a corresponding single-bit value representing a detected condition. In one such embodiment, the one or more parameters further facilitate selection from among multiple possible modes of evaluation—e.g., wherein a first mode provides a multi-bit evaluation based on a given condition, a second mode provides a single-bit evaluation based on the given condition, and a third mode disables the providing of either or both of a multi-bit evaluation or a single-bit evaluation based on the given condition.

In various embodiments, the programming at 210 is at least a part of operations to provide power management circuitry of an SOC with a configuration state which determines, at least in part, how communications and/or other operations are to be performed by such circuitry to identify a next power state for the SOC. For example, such configuration state is provided by writing data to one or more mode registers and/or other suitable resources which are included in, or otherwise accessible, to the power management circuitry. Alternatively or in addition, such configuration state is provided by configuring (e.g., including reconfiguring) one or more switches, multiplexers, demultiplexers, and/or other suitable components of the power management circuitry.

In one such embodiment, the power management circuitry is provided with additional or alternative configuration state that is based, for example, on signal generation information, mode transition information and/or rank information. Such configuration state is provided, for example, by a BIOS process of the SOC. Alternatively or in addition, providing such configuration state includes reconfiguring (e.g., reprogramming) the power management circuitry with updated criteria information, signal generation information, mode transition information and/or rank information.

Method 200 further comprises (at 212) receiving first signals at the evaluator circuitry after the programming of the evaluator circuitry, wherein the first signals indicate a state of the SOC. The state comprises multiple detected conditions of the SOC—e.g., including one or more actual conditions and/or one or more expected future conditions. In some embodiments, the criteria with which the evaluation circuitry is programmed at 210 each include a respective one or more test conditions, wherein the multiple detected conditions of the SOC state correspond to a superset of all such test conditions of the criteria.

In some embodiments, method 200 further comprises operations (not shown) which, for example, include including programming signal generator circuitry based on a definition of a format of the first signals which are received at 212. In one such embodiment, said operations further comprise receiving sensor signals at the signal generator circuitry after the signal generator circuitry has been so programmed, where the sensor signals indicate the detected SOC state. The signal generator circuitry then generates the first signals, for example, based on the sensor signals and the definition of the format.

Method 200 further comprises (at 214) concurrently performing at the evaluator circuitry multiple evaluations which are each based on the state of the SOC and a different respective criteria of the multiple criteria. For example, in some embodiments, the first signals each correspond to a different respective condition of the detected SOC state. In one such embodiment, the evaluator circuitry comprises an array of circuit cells which (based on the programming at 210) each correspond to a different respective combination of a test condition and a detected condition of the SOC state. For example, the array comprises circuit cells which are variously configured each to evaluate whether a corresponding detected condition satisfies a corresponding test condition. In one example embodiment, rows of the array each correspond to a different respective criteria of the multiple criteria, wherein columns of the array each correspond to a different respective detected condition of the SOC state.

Method 200 further comprises (at 216) providing respective results of the multiple evaluations in parallel from the evaluator circuitry to selector circuitry. In various embodiments, the results each indicate whether a corresponding criteria is satisfied by the detected state of the SOC. Accordingly, said results variously indicate, for each such criteria, whether a power mode corresponding to said criteria can be accommodated by the detected SOC state.

Method 200 further comprises (at 218) at the selector circuitry, selecting a first power mode based on the results. In some embodiments, the selector circuitry is programmed with rank information which indicates relative priorities of the multiple power modes with respect to each other—e.g., where the selecting at 218 is further based on the relative priorities. In an illustrative scenario according to one such embodiment, the results identify a plurality of power modes as candidate power modes, wherein the selecting of the first power mode at 218 is based on a determination that, of the candidate power modes, the first power mode is a highest priority power mode.

Method 200 further comprises (at 220), generating second signals to transition the SOC to the first power mode, wherein the second signal is generated with controller circuitry based on the selecting at 218. In various embodiments, the controller circuitry is programmed with mode transition information which indicates sequences of actions, the sequences each to transition to a respective power mode. In one such embodiment, the second signals are generated at 220 based on said mode transition information.

Figure 3:
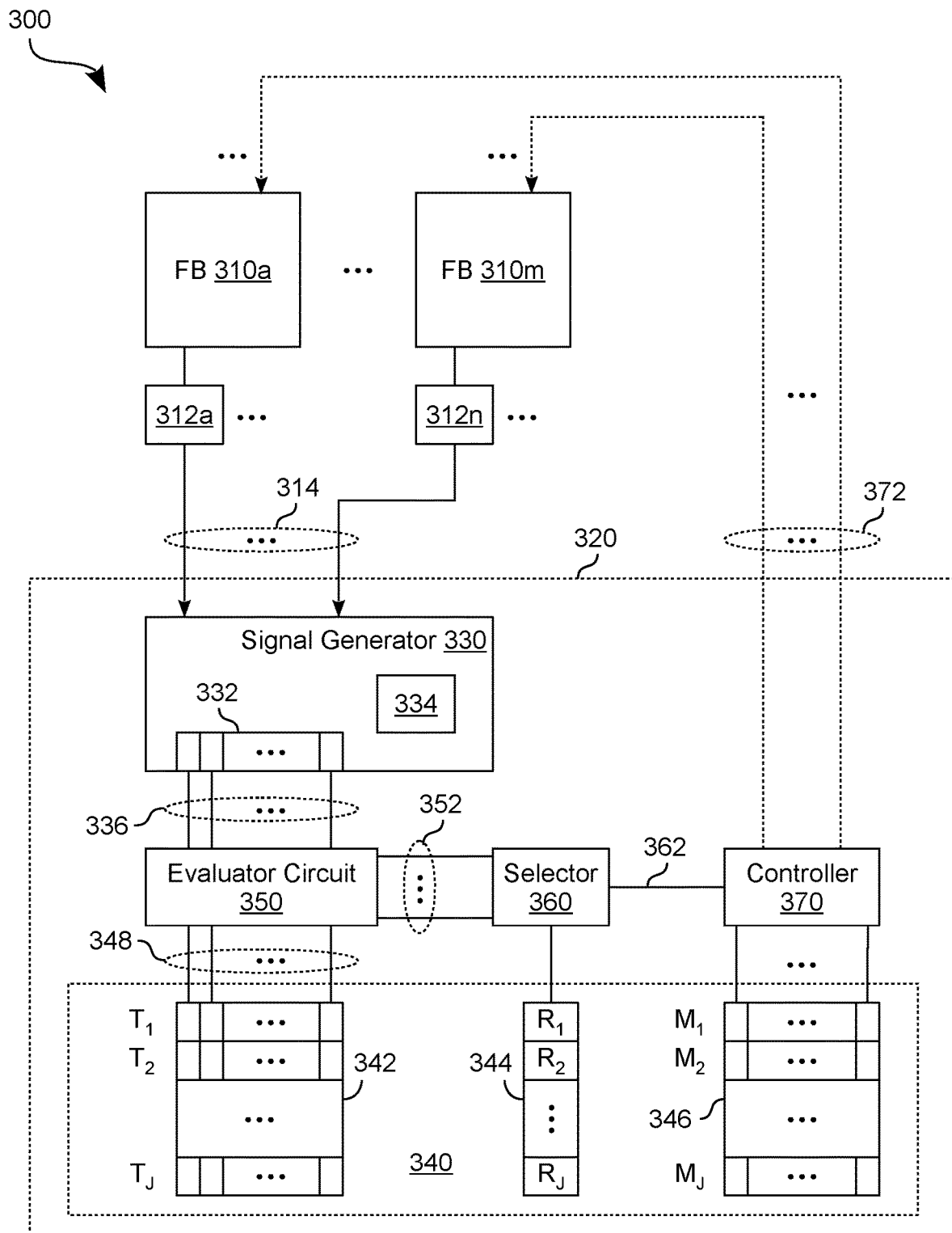
FIG. 3 illustrates a functional block diagram showing elements of a system-on-chip to implement a power mode which is determined according to an embodiment.

FIG. 3 shows features of a system-on-chip (SOC) 300 to implement a power mode which is determined according to an embodiment. FIG. 3 illustrates one example of an embodiment wherein a SOC is programmable or otherwise configurable (e.g., reconfigurable) to determine how communications and/or other operations are to be performed at the SOC to identify a next power state. SOC 300 includes some or all of the features of SOC 100, for example.

As shown in FIG. 3, SOC 300 comprises functional blocks (FBs) 310a, ..., 310m which, for example, variously provide respective functionality such as that of memory controller 140, memory 142, controller 115, display module 160, hub module 162, and/or the like. SOC 300 further comprises power management circuitry 320, which is operable to detect some state of FBs 310a, ..., 310m and, based on such a state, to provide one or more signals to transition SOC 300 from a current power mode to a next power mode.

In an embodiment, power management circuitry 320 provides functionality of power management circuitry 110—e.g., wherein a signal generator 330, an evaluator circuit 350, a selector 360, and a controller 370 of power management circuitry 320 correspond functionally to signal generator 112, evaluator logic 113, selector 114, and controller 115 (respectively). For example, power management circuitry 320 is coupled to receive sensor signals 314 that indicate detected conditions of FBs 310a, ..., 310m—e.g., wherein FBs 310a, ..., 310m variously include (or are coupled to) sensors 312a, ..., 312n which generate sensor signals 314.

In an embodiment, a state of SOC 300 at a given time (for example, including a state of FBs 310a, ..., 310m) comprises multiple detected conditions which are indicated by sensor signals 314. For example, a given one of such detected conditions comprises or otherwise indicates the presence, or absence, of a characteristic (e.g., a temperature, pressure, acceleration, sound, light, vibration, orientation, or the like) of an environment in or near SOC 300 and/or a characteristic of one or more operations performed by SOC 300. By way of illustration and not limitation, such a condition is detected at a particular time, or over some period of time. Alternatively or in addition, a detected condition is one which (according to some predefined criteria) has been determined to be expected in the future. In some embodiments, a detected condition is represented with a metric value which, for example, measures specifies or otherwise indicates a level, a rate of change (first order, second order, or the like) and/or other such feature of a supply voltage, a reference voltage, a signal current, or any of various other electrical characteristic. Alternatively or in addition, a condition specifies or otherwise indicates an occurrence or non-occurrence of one or more events of a particular event type—e.g., including a count of such events, a rate of change of such events, or the like. Examples of such an event include, but are not limited to, a memory access event, a data error event, an error handling event, a user interaction with an I/O interface mechanism (such as a touchscreen, keyboard, microphone or the like), etc. In some embodiments, a detected condition comprises an availability, or unavailability, of a power supply, a wired network, a wireless network, a communication path (e.g., a data link or channel) or other such resource of SOC 300.

In some embodiments, generation and communication of sensor signal 314 comprise one or more operations which are adapted, for example, from conventional techniques for monitoring the state of an integrated circuit. Various embodiments are not limited with respect to the particular number and/or types of detected conditions which are indicated by sensor signals 314, or with respect to particular mechanisms by which sensor signals 314 are generated and communicated to signal generator 330.

In some embodiments, signal generator 330 provides functionality to determine, based on sensor signals 314, state information 332 which comprises multiple conditions of the detected state. In one such embodiment, signal generator 330 receives sensor signals 314 while signal generator 330 is configured based on a definition of a format for signals 336 which are to communicate a detected state of FBs 310*a*, . . . , 310*m*. By way of illustration and not limitation, signal generator 330 is programmed to include or otherwise has access to signal generation information 334 which defines a format for state information 332 and/or a format according to which signals 336 are to communicate state information 332 to evaluator circuit 350. In some embodiments, such a format accommodates a configuration (e.g., a programming) of evaluator circuit 350, where such configuration is based on multiple criteria which each correspond to a different respective power mode.

Circuitry of signal generator 330 performs one or more translation, conversion, mapping and/or other such operations to determine values of state information 332, where such determining is based on signal generation information 334 and information which is communicated by sensor signals 314. In some embodiments, signal generator 330 is operable to be reprogrammed or otherwise reconfigured based on such signal generation information—e.g., wherein signal generator 330 is programmed with signal generation information 334 during a first boot-up process of SOC 300, and where signal generator 330 is instead programmed with different signal format information during a previous (or subsequent) boot-up process of SOC 300. Such reconfiguration enables signal generator 330 to provide a different formatting of state information 332 and/or signals 336 at various times. Alternatively or in addition, such reconfiguration enables signal generator 330 to provide formatting of state information 332 and/or signals 336 based on a different order or other arrangement by which signal generator 330 receives sensor signals 314.

In an embodiment, evaluator circuit 350 is coupled to receive signals 336 while evaluator circuit 350 is programmed or otherwise configured based on multiple criteria which each correspond to a different respective power mode of SOC 300. By way of illustration and not limitation, evaluator circuit 350 is configured—e.g., programmed—to include or otherwise have access to criteria information 342 which indicates J criteria $T_1, \ldots, T_J$ (where J is an integer greater than one) which each correspond to a different respective power mode of J power modes $M_1, \ldots, M_J$ of SOC 300. Criteria $T_1, \ldots, T_J$ each include a respective one or more test conditions which each correspond to a respective one of the detected conditions which are indicated by state information 332 and communicated with signals 336. In an example embodiment, the detected conditions which are communicated via signals 336 correspond to a superset of the respective test conditions of criteria $T_1, \ldots, T_J$.

In an embodiment, evaluator circuit 350 concurrently performs multiple evaluations which are each based on the detected state of SOC 300 (as indicated by signals 314). Such multiple evaluations are further based each on a different respective criteria of the multiple criteria $T_1, \ldots, T_J$. For example, for a given criterion $T_j$ of multiple criteria $T_1, \ldots, T_J$—where $j \in \{1, \ldots, J\}$—the criterion $T_j$ comprises one or more test conditions which each correspond to a different respective one of the detected conditions indicated by signals 336. In such an embodiment, evaluator circuit 350 evaluates whether the one or more test conditions of criterion $T_j$ are each satisfied by the corresponding detected condition.

In some embodiments, evaluator circuit 350 is operable to be reprogrammed or otherwise reconfigured based on such criteria information—e.g., wherein evaluator circuit 350 is programmed with criteria information 342 during a first boot-up process of SOC 300, and where evaluator circuit 350 is instead programmed with different criteria information during a previous (or subsequent) boot-up process of SOC 300. Such reconfiguration enables evaluator circuit 350 to perform respective evaluations for more, fewer and/or different power modes at various times.

In an embodiment, selector 360 is coupled to receive respective results of the multiple evaluations which are performed by evaluator circuit 350 based on signals 336. For example, selector 360 is coupled to receive signals 352 which each indicate a respective evaluation result. In some embodiments, signals 352 are communicated to selector 360 in parallel with each other. Signals 352 indicate, for example, which (if any) of power modes $M_1, \ldots, M_J$ is a candidate power mode could be accommodated by the detected state of SOC 300. Based on signals 352, selector 360 selects one such candidate power mode as a power mode to be implemented with SOC 300.

In an embodiment, selection of a power mode from among one or more candidate power modes is based on rank information which indicates relative priorities of power modes $M_1, \ldots, M_J$ with respect to each other. By way of illustration and not limitation, selector 360 receives evaluation results via signals 352 while selector 360 is programmed or otherwise configured to include (or otherwise have access to) rank information 344 which identifies respective rank values $R_1, \ldots, R_J$ for power modes $M_1, \ldots, M_J$. In one such embodiment, the results indicated by signals 352 identify a plurality of power modes as candidate power modes, wherein selector 360 selects a given one of said power modes based on a determination that, of the candidate power modes, the given power mode is a highest priority power mode.

In some embodiments, selector 360 is operable to be reprogrammed or otherwise reconfigured based on such rank information—e.g., wherein selector 360 is programmed with rank information 344 during a first boot-up process of SOC 300, and where selector 360 is instead programmed with different rank information during a previous (or subsequent) boot-up process of SOC 300. Such reconfiguration enables selector 360 to provide a different prioritization the same of power modes, to provide a prioritization of more, fewer and/or different power modes, and/or the like at various times.

In the example embodiment shown, controller 370 is coupled to receive from selector 360 a signal 362 which identifies a power mode that has been selected from among the one or more candidate power modes. Responsive to signal 362, controller 370 generates one or more signals (such as the illustrative control signals 372 shown) to transition SOC 300 to the selected power mode. By way of illustration and not limitation, controller 370 is programmed to include, or otherwise to have access to, mode parameter information 346 which specifies or otherwise indicates, for each of power modes $M_1, \ldots, M_J$, a respective one or more operational parameter settings to implement said power mode. In some embodiments, mode parameter information 346 further indicates a particular order of actions to transition between a given two power modes.

Based on the selected power mode which is indicated by signal 362, and further based on mode parameter information 346, controller 370 communicates—to FBs $310a, \ldots, 310m$ and/or any of various other resources of SOC 300—control signals 372 which transition SOC 300 to the selected power state. For example, control signals 372 are communicated to change the operation of one or more of a processor pipeline, a memory controller, a memory device, a buffer, a cache, a mode register, clock gating logic, power gating logic, and/or the like. In some embodiments, changing such operation of SOC 300 in response to control signals 372 comprises one or more actions which, for example, are adapted from conventional techniques for configuring a power mode of integrated circuitry. Various embodiments are not limited with respect to a particular power mode which is to be implemented based on control signals 372, or with respect to particular actions to implement such a power mode in response to signals 372.

In some embodiments, controller 370 is operable to be reprogrammed or otherwise reconfigured based on such mode parameter information—e.g., wherein controller 370 is programmed with mode parameter information 346 during a first boot-up process of SOC 300, and where controller 370 is instead programmed with different mode parameter information during a previous (or subsequent) boot-up process of SOC 300. Such reconfiguration enables controller 370 to variously transition between more, fewer and/or different power modes at various times.

Figure 4:
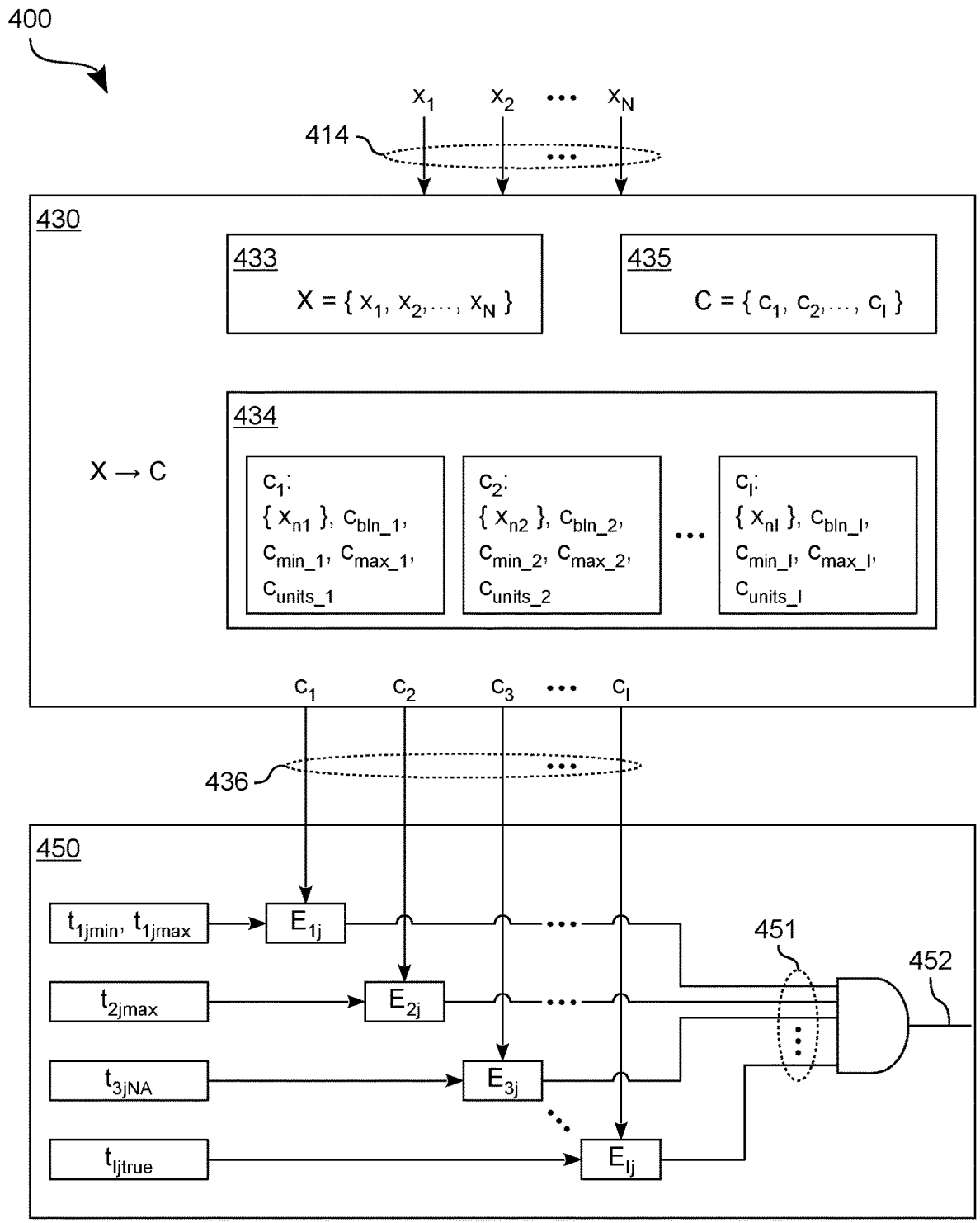
FIG. 4 illustrates a functional block diagram showing elements of power management circuitry to signal a power mode transition according to an embodiment.

FIG. 4 shows features of a power management circuitry 400 for signaling a power mode transition according to an embodiment. Power management circuitry 400 is one example of an embodiment wherein circuit logic of a SOC is configurable to perform one or more evaluations which each correspond to a different respective test condition of a criteria for a given power mode. In some embodiments, power management circuitry 400 includes some or all of the features of power management circuitry 110, for example, and/or is operable to perform some or all of method 200.

As shown in FIG. 4, power management circuitry 400 comprises a signal generator 430 which, for example, corresponds functionally to one of signal generator 112 or signal generator 330—e.g., where evaluator circuitry 450 of power management circuitry 400 corresponds functionally to one of evaluator circuit 350 or evaluator logic 113. Signal generator 430 is coupled to receive, as inputs 414, some N sensor signals $x_1, x_2, \ldots, x_N$ (where N is an integer greater than one) which, in a given period of time, specify or otherwise indicate a detected state of a SOC which includes power management circuitry 400. Based on sensor signals $x_1, x_2, \ldots, x_N$, signal generator 430 determines I values $c_1, c_2, c_3, \ldots, c_I$ (where I is an integer greater than one) which each indicate a respective condition of the detected state—e.g., wherein an output 436 from signal generator 430 communicates values $c_1, c_2, c_3, \ldots, c_I$ to evaluator circuitry 450.

In an example embodiment, determining values $c_1, c_2, c_3, \ldots, c_I$ comprises signal generator 430 translating, converting, mapping or otherwise processing sensor signals $x_1, x_2, \ldots, x_N$ based reference information which, for example, includes one or more of the illustrative input order information 433, format information 434, or output order information 435 shown. In one such embodiment, input order information 433 identifies a particular arrangement X (e.g., an order or other configuration) of respective inputs 414 by which signals $x_1, x_2, \ldots, x_N$ are received. For example, signals $x_1, x_2, \ldots, x_N$ are each of a respective sensor signal type (e.g., each to one of a temperature signal type, a voltage condition type, a current condition type, a particular event type, or the like), where input order information 433 identifies a correspondence of inputs 414 each to a respective one of such sensor signal types. Alternatively or in addition, output order information 435 identifies a particular arrangement C according to which values $c_1, c_2, c_3, \ldots, c_I$ are to be communicated each via a respective signal of output 436.

Format information 434 specifies or otherwise indicates, for a given value $c_i$ of the values $c_1, c_2, c_3, \ldots, c_I$ (where $i \in \{1, \ldots, I\}$), a respective format by which the value $c_i$ is to represent a corresponding condition of the detected SOC state. By way of illustration and not limitation, format information 434 identifies a range of possible values for $c_i$, a unit of measurement (e.g., millivolts, milliamps, degrees Celsius, etc.) by which $c_i$ represents a corresponding detected condition, and/or one or more sensor signals which are the basis determining $c_i$—e.g., where format information 434 identifies a function for calculating $c_i$ based on one or more of sensor signals $x_1, x_2, \ldots, x_N$.

In the example embodiment shown, format information 434 identifies (for example) that value $c_1$ is to be determined based on a first one or more signals $\{x_{n1}\}$ of signals $x_1, x_2, \ldots, x_N$, that value $c_2$ is to be determined based on a second one or more signals $\{x_{n2}\}$ of signals $x_1, x_2, \ldots, x_N$, and that value $c_I$ is to be determined based on an Ith one or more signals $\{x_{nI}\}$ of signals $x_1, x_2, \ldots, x_N$. Alternatively or in addition, format information 434 includes respective minimum possible values $c_{min\_1}, c_{min\_2}, \ldots c_{min\_I}$ for $c_1, c_2, \ldots, c_I$, respective maximum possible values $c_{max\_1}, c_{max\_2}, \ldots, c_{max\_I}$ for $c_1, c_2, \ldots, c_I$, and/or respective units of measurement $c_{units\_1}, c_{units\_2}, \ldots, c_{units\_I}$ represented by $c_1, c_2, \ldots, c_I$. In some embodiments, format information 434 additionally or alternatively includes values $c_{bln\_1},$ $c_{bln\_2}, \ldots, c_{bln\_I}$ which identify, for each of $c_1, c_2, \ldots, c_I$ (respectively), whether the value is a single bit Boolean value or, alternatively, a multi-bit value. In various embodiments, signal generator 430 supports being reprogrammed or otherwise reconfigured with updated versions of input order information 433, format information 434, and/or output order information 435—e.g., wherein such updating is provided by a BIOS process of the SOC.

For a given criterion of the multiple criteria (which each correspond to a different respective power mode), evaluator circuitry 450 provides multiple evaluator circuits which are variously programmable or otherwise configurable each to evaluate whether a respective test condition of the criterion is satisfied by a corresponding one of values $c_1, c_2, \ldots, c_I$. In an illustrative scenario according to one embodiment, evaluator circuitry 450 comprises evaluator circuits $E_{1j}$, $E_{2j}, \ldots E_{3j}, \ldots, E_{Ij}$ which are variously configured each to evaluate whether a corresponding one of values $c_1$, $c_2$, $c_3, \ldots, c_I$ satisfies a different respective test condition of criterion $T_j$.

In an illustrative scenario according to one embodiment, evaluator circuit $E_{1j}$ is programmed to perform an evaluation as to whether value $c_{1j}$ is between a minimum threshold value $t_{1jmin}$ and a maximum threshold value $t_{1jmax}$. Additionally or alternatively, evaluator circuit $E_{2j}$ is programmed to perform an evaluation as to whether value $c_{2j}$ is less than another maximum threshold value $t_{2jmax}$. In one such embodiment, evaluator circuit $E_{3j}$ is programmed to forego any evaluation of value $c_{3j}$—e.g., based on a programmed value $t_{3jNA}$ which indicates that, with respect to criterion $T_j$, the detected condition represented by value $c_{3j}$ is a "don't care" condition. Additionally or alternatively, evaluator circuit $E_{Ij}$ is programmed to perform an evaluation (such as a Boolean XNOR operation) as to whether a single bit value $c_I$ is equal to a single bit test value $t_{Ijtrue}$. In one such embodiment, the programming of evaluator circuits $E_{1j}$, $E_{2j}$, $E_{3j}, \ldots, E_{Ij}$ includes, for example, writing some or all of $t_{1jmin}$, $t_{1jmax}$, $t_{2jmax}$, $t_{3jNA}$, or $t_{Ijtrue}$ to respective registers, configuring one or more switches, multiplexers or other such circuit components, and/or the like.

In an embodiment, results 451 of respective evaluations by evaluator circuits $E_{1j}$, $E_{2j}$, $E_{3j}, \ldots, E_{Ij}$ are logically AND'ed (or otherwise combined) to generate a signal 452 which indicates whether criterion $T_3$ is satisfied by the detected state which is indicted by values $c_1, c_2, c_3, \ldots, c_I$. Signal 452 is then communicated from evaluator circuitry 450 in parallel with one or more other such evaluation result signals (not shown)—e.g., wherein signal 452 is one of signals 352. It is to be appreciated that the particular number and type of evaluations performed by evaluator circuits $E_{1j}$, $E_{2j}$, $E_{3j}, \ldots, E_{Ij}$ (or other such circuits of evaluator circuitry 450) is merely illustrative, and not limiting on some embodiments.

Figure 5:
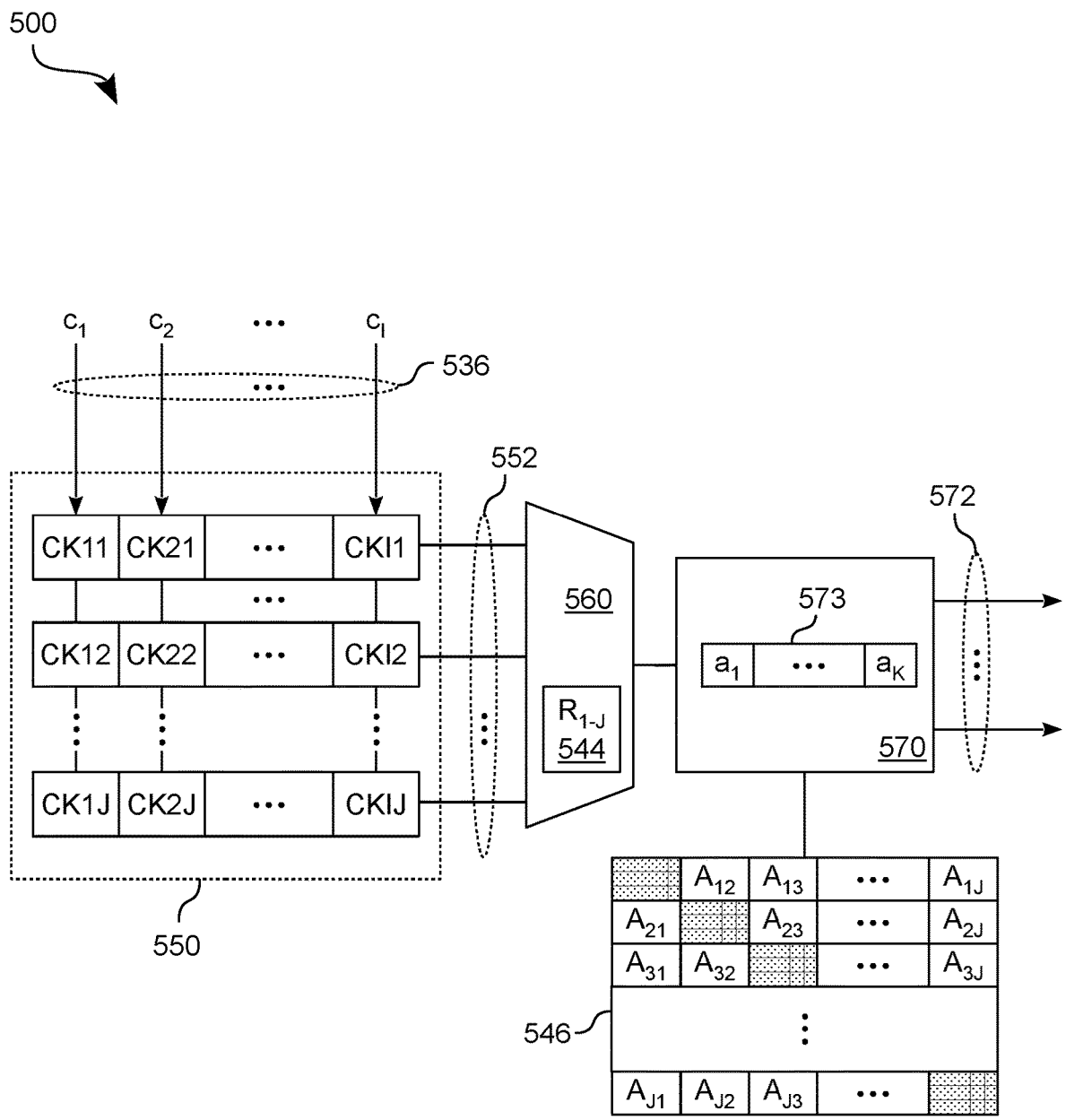
FIG. 5 illustrates a functional block diagram showing elements of power management circuitry to determine a transition between power modes according to an embodiment.

FIG. 5 shows features of a power management circuitry 500 to determine a transition between power modes according to an embodiment. Power management circuitry 500 is one example of an embodiment wherein evaluator circuitry comprises an array of circuit cells (or "cells," for brevity) which are programmable each to perform a different respective evaluation based on a corresponding combination of a test condition and a detected condition of an SOC. Power management circuitry 500 includes some or all of the features of power management circuitry 110, power management circuitry 320, or power management circuitry 400—e.g., where power management circuitry 500 provides functionality to perform operations of method 200.

As shown in FIG. 5, power management circuitry 500 includes evaluator circuitry 550, multiplexer circuitry 560, and a controller 570 which—for example—correspond functionally to evaluator logic 113, selector 114, and controller 115 (respectively). Power management circuitry 500 supports communication of signals 536, signals 552, and control signals 572 that, in some embodiments, correspond functionally to signals 336, signals 352, and control signals 372 (respectively).

In the illustrative embodiment shown, evaluator circuitry 550 comprises circuits that, for example, variously support functionality such as that provided by evaluator circuits $E_{1i}$, $E_{2j}$, $E_{3j}, \ldots, E_{Ij}$ of evaluator circuitry 450. Such circuits of evaluator circuitry 550 are variously identified in FIG. 5 using a labeling scheme CKij, where the notation "i" denotes a detected condition to be received by the circuit in question, and the notation "j" denotes a criterion which is supported in part by the circuit in question. Accordingly, the combination "ij" denotes a particular test condition of a particular criterion—e.g., where an ith test condition of the jth criterion is to be evaluated based on a corresponding ith detected condition indicated by signals 536.

By way of illustration and not limitation, a circuit cell array of evaluator circuitry 550 comprises a row of cells CK11, CK21, ..., CKI1 which are to perform respective evaluations for a first criterion—e.g., where a row of cells CK12, CK22, ..., CKI2 are to perform respective evaluations for second criterion, and a row of cells CK1J, CK2J, ..., CKIJ are to perform respective evaluations for Jth criterion. In one such embodiment, a column of cells CK11, CK12, ..., CK1J are each coupled to receive a signal identifying condition $c_1$—e.g., where a column of cells CK21, CK22, ..., CK2J are each coupled to receive a signal identifying condition $c_2$, and a column of cells CKI1, CKI2, ..., CKIJ are each coupled to receive a signal identifying condition $c_I$. Such cells are variously operable each to perform a respective determination as to whether a given detected condition of SOC state satisfies a test condition for which the cell has been programmed or otherwise configured (e.g., reconfigured). For a given cell, such a configuration is based, for example, on a minimum threshold value, a maximum threshold value, a reference Boolean (single bit) value, an identifier of whether a condition is a don't care condition, and/or the like.

Based on the detected conditions $c_1, c_2, c_3, \ldots, c_I$ which are communicated column-wise into the cell array of evaluator circuitry 550, evaluation results are variously generated by the cell array and communicated, in parallel with each other, as signals 552 which are received by multiplexer circuitry 560. Signals 552 identify which power modes (if any) are candidate modes that can be accommodated by the detected SOC state. Based on priority information $R_{1-J}$ 544 (e.g., including rank information 344), multiplexer circuitry 560 provides to controller 570 a signal which identifies a selected power mode which, of the one or more candidate modes indicated by signals 552, is a relatively highest priority mode.

In one such embodiment, controller 570 is to programmed (e.g., reprogrammed) with mode transition information 546 which identifies action sequences each to transition between a respective two power modes. By way of illustration and not limitation, mode transition information 546 specifies or otherwise indicate a sequence $A_{12}$ of actions to transition from a first power mode to a second power mode, a sequence $A_{13}$ of actions to transition from the first power mode to a third power mode, a sequence $A_{IJ}$ of actions to transition from the first power mode to a Jth power mode, etc. Based on the selected power mode (as indicated by multiplexer circuitry 560) and mode transition information 546, controller 570 identifies a vector 573 of actions $a_1, \ldots, a_K$ to transition the SOC from a currently-implemented power mode to the selected power mode. In response to the identification of vector 573, controller 570 communicates control signals 572 to various functional blocks of the SOC—e.g., wherein control signals 572 are communicated according to a sequence indicated by mode transition information 546.

Figure 6A:
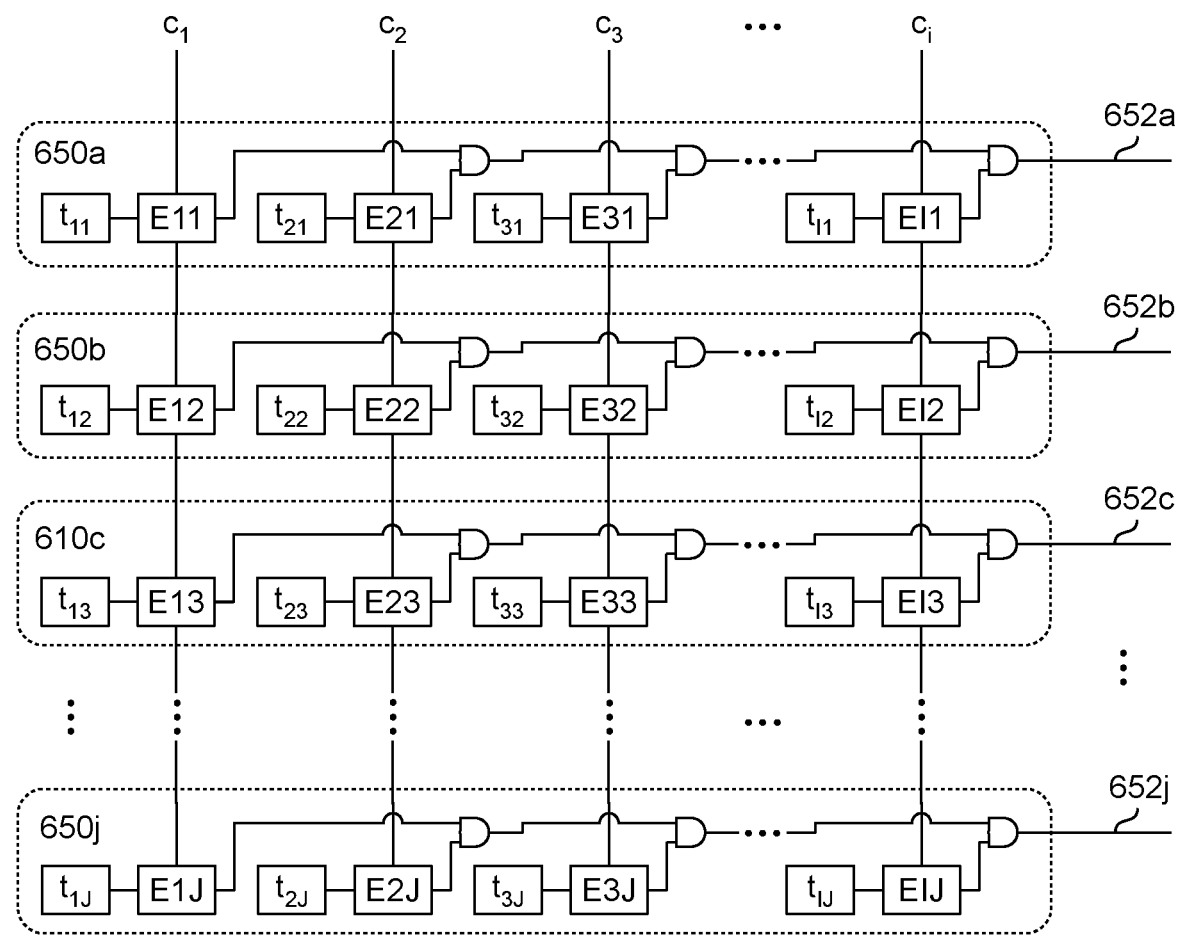
FIG. 6A illustrates a hybrid logic and functional block diagram showing elements of evaluation circuitry for identifying candidate power modes to be made available for selection according to an embodiment.

FIG. 6A shows features of evaluator circuitry 600 to identify one or more power modes as being available to be configured with a SOC according to an embodiment. Evaluator circuitry 600 is one example of an embodiment wherein an array of circuit cells are configurable perform evaluations each based on a different respective combination of a test condition and a corresponding detected condition of an SOC. In some embodiments, evaluator circuitry 600 includes features of evaluator logic 113, evaluator circuit 350, evaluator circuit 450 or evaluator circuitry 550—e.g., wherein evaluator circuitry 600 provides functionality to perform operations of method 200. Evaluator circuitry 600 supports communication of signals 652a, 652b, 652c, ..., 652ja, ..., 652j that, for example, correspond functionally to signals 352 or signals 552.

As shown in FIG. 6A, evaluator circuitry 600 includes an array of circuit cells including (for example) a row 650a of cells E11, E21, E31, ..., EI1 which are to perform respective evaluations for a first criterion—e.g., where a row 650b of cells E12, E22, E32, ..., EI2 are to perform respective evaluations for a second criterion, a row 650c of cells E13, E23, E33, ..., EI3 are to perform respective evaluations for a third criterion, and a row 650j of cells E1J, E2J, E3J, ..., EIJ are to perform respective evaluations for a Jth criterion.

In an illustrative scenario according to one embodiment, a SOC includes evaluator circuitry 600, where (at a given time) a detected state of the SOC includes conditions $c_1, c_2, c_3, \ldots, c_I$. In one such embodiment, evaluator circuitry 600 is coupled to receive signals (such as signals 336) which variously identify said detected conditions of the SOC state. By way of illustration and not limitation, a column of cells E11, E12, ..., E1J are each coupled to receive a signal identifying condition $c_1$—e.g., where a column of cells E21, E22, ..., E2J are each coupled to receive a signal identifying condition $c_2$, a column of cells E31, E33, ..., E3J are each coupled to receive a signal identifying condition $c_3$, and a column of cells EI1, EI2, ..., EIJ are each coupled to receive a signal identifying condition $c_I$.

Such cells are variously operable each to perform a respective determination as to whether a given detected condition satisfies a test condition for which the cell has been programmed or otherwise configured (e.g., reconfigured). For example, each such cell is programmable or otherwise configurable to include or otherwise have access to one or more parameters of a respective test condition. Such one or more parameters for a given cell are variously identified in FIG. 6A using a labeling scheme $t_{ij}$, where the notation "i" denotes a detected condition to be received by the cell in question, and the notation "j" denotes a criterion which is supported in part by the cell in question. For example, cell $E_{11}$ is programmed to evaluate condition $c_1$ based on one or more parameters $t_{11}$ of a first test condition of the first criterion—e.g., where cell E22 is programmed to evaluate condition $c_2$ based on one or more parameters $t_{22}$ of a second test condition of the second criterion. In various embodiments, some or all such test condition parameters include features of criteria information 342.

Row 650a outputs a signal 652a which, for example, represents a logical ANDing (or other suitable combination) of respective evaluation results which are generated by cells E11, E21, E31, ..., EI1—e.g., where signal 652a indicates whether the detected state could accommodate a power state which corresponds to the first criterion. In one such embodiment, signal 652a is output in parallel with other signals 652b, 652c, ..., 652j which are similarly generated by rows 650b, 650c, ..., 650j (respectively).

Figure 6B:
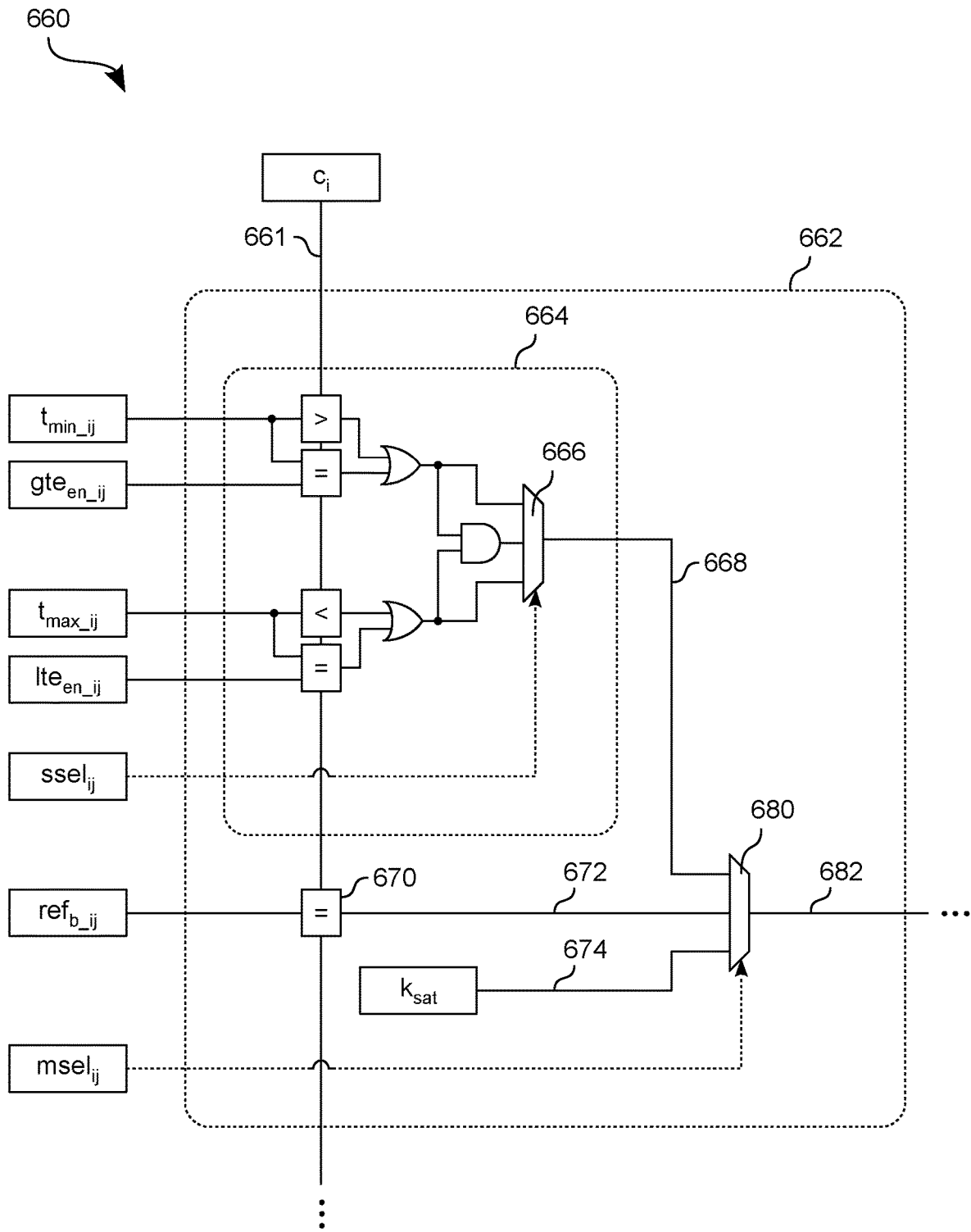
FIG. 6B illustrates a hybrid logic and functional block diagram showing elements of a programmable circuit cell to facilitate identification of a candidate power mode according to an embodiment.

FIG. 6B shows features of evaluator circuitry 600 which is programmable to identify, according to an embodiment, whether a detected condition of a circuit state satisfies a test condition which corresponds to a given power mode. Evaluator circuitry 600 is one example of an embodiment wherein an array of circuit cells comprises a circuit cell which is programmable or otherwise configurable to perform any of various evaluations based on a detected condition. For example, evaluator circuitry 660 includes features of evaluator circuitry 600—e.g., wherein evaluator circuitry 600 provides functionality to perform operations of method 200.

As shown in FIG. 6B, evaluator circuitry 600 includes a programmable circuit cell 662 that, for example, provides functionality of a cell of evaluator circuitry 550, or a cell of evaluator circuitry 600. In an illustrative scenario according to one embodiment, a SOC includes evaluator circuitry 660, where (at a given time) a detected state of the SOC comprises multiple conditions including a condition $c_i$. In one such embodiment, cell 662 is coupled to receive a signal (e.g., one of signals 336) which identifies condition $c_i$. Cell 662 provides functionality to evaluate whether condition $c_i$ satisfies a test condition of a criterion for a given power mode—e.g., where cell 662 is programmable based on any of various test conditions.

In an embodiment, such programming of cell 662 is based on one or more parameters of a particular test condition—e.g., wherein cell 662 is configured to include or otherwise have access to said one or more parameters. By way of illustration and not limitation, such one or more parameters include a minimum threshold value $t_{min\_ij}$ for a value of $c_i$, and a maximum threshold value $t_{max\_ij}$ for a value of $c_i$. Alternatively or in addition, such one or more parameters include (for example) a value $gte_{en\_ij}$ to selectively enable/disable a "greater than or equal to" (gte) comparator functionality of comparator circuit 664, and/or a value $lte_{en\_ij}$ to selectively enable/disable a "less than or equal to" (lte) comparator functionality of comparator circuit 664. In one such embodiment, the one or more parameters further comprise a value $ssel_{ij}$ with which a multiplexer 666 (or other suitable circuitry) is controlled to selectively output a signal 668 which is based on a particular combination of an evaluation based on the minimum threshold value $t_{min\_ij}$ and/or an evaluation based on the maximum threshold value $t_{max\_ij}$.

In various embodiments, the one or more parameters of the test condition additionally or alternatively include (for example) a single-bit value $ref_{b\_ij}$ which is to be a reference for a Boolean evaluation (if any) of a single-bit value of $c_i$. By way of illustration and not limitation, cell 662 comprises a comparator 670 (e.g., a XNOR gate) which is to indicate with a signal 672 whether $ref_{b\_ij}$ is equal to a corresponding single-bit value of $c_i$.

In some embodiments, circuit cell 662 further comprises a multiplexer 680 which is coupled to receive signals 668, 672, and, in some embodiments, another signal 674 representing a value $k_{sat}$ which indicates that, with respect to the criterion in question, condition $c_i$ is a "don't care" condition. In one such embodiment, another configured parameter (represented as a mode select parameter $msel_{ij}$) controls a selection by multiplexer 680 between signals 668, 672, 674. As a result, a signal 682 which is output by multiplexer 680 represents a selected one of a result of a multi-bit evaluation by comparator circuit 664, a result of a single-bit evaluation by comparator 670, or a "don't care" output which is independent of any such multi-bit evaluation or single-bit evaluation. Accordingly, multiplexer 680 and the parameter $msel_{ij}$ facilitate a configurability of cell 662 to select between a first mode which provides a multi-bit evaluation functionality, a second mode which provides a single-bit evaluation functionality, and a third ("don't care") mode which disables both the multi-bit evaluation functionality and the single-bit evaluation functionality.

Figure 7:
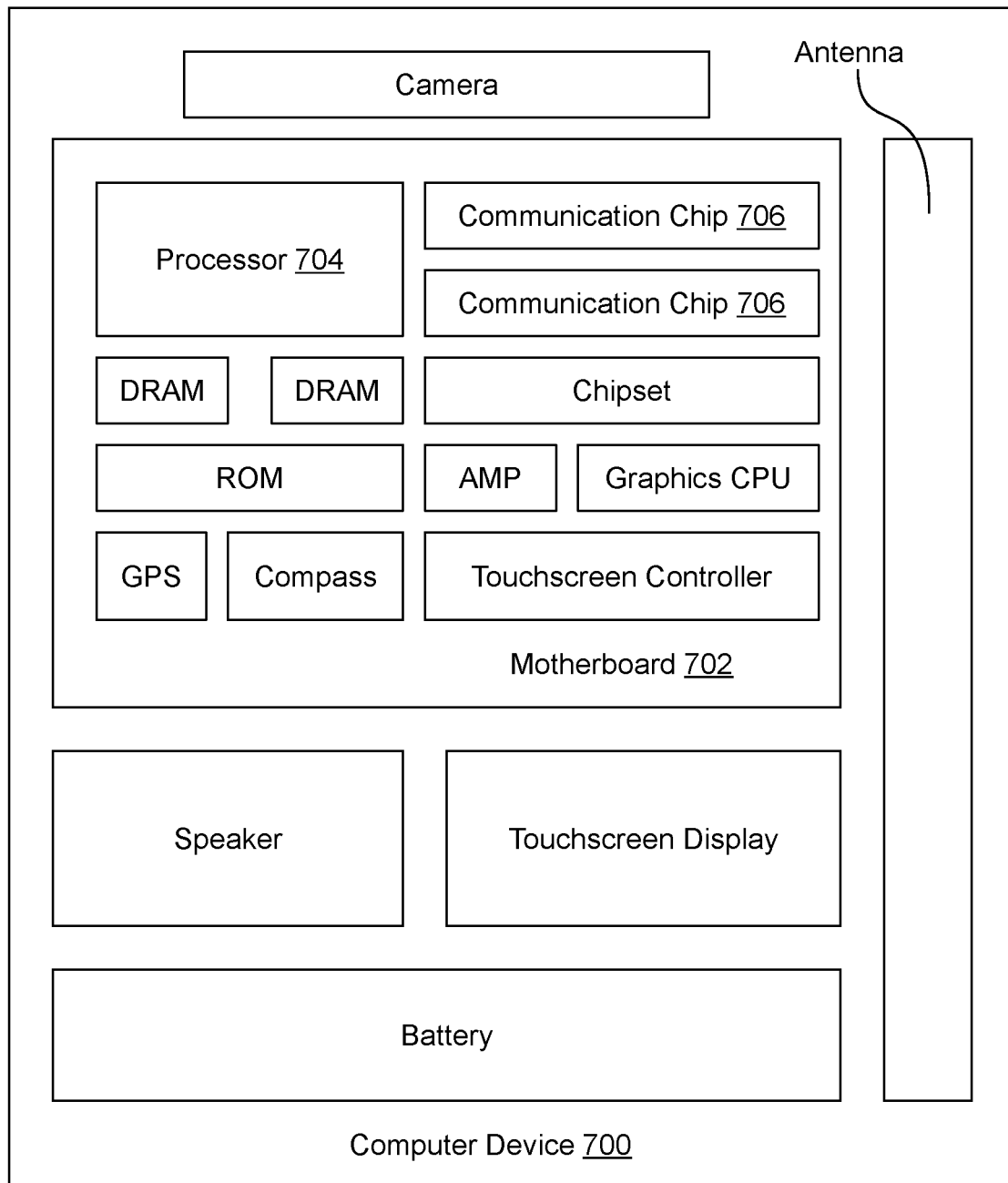
FIG. 7 illustrates a functional block diagram showing a computing device in accordance with one embodiment.

FIG. 7 illustrates a computing device 700 in accordance with one embodiment. The computing device 700 houses a board 702. The board 702 may include a number of components, including, but not limited to, a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
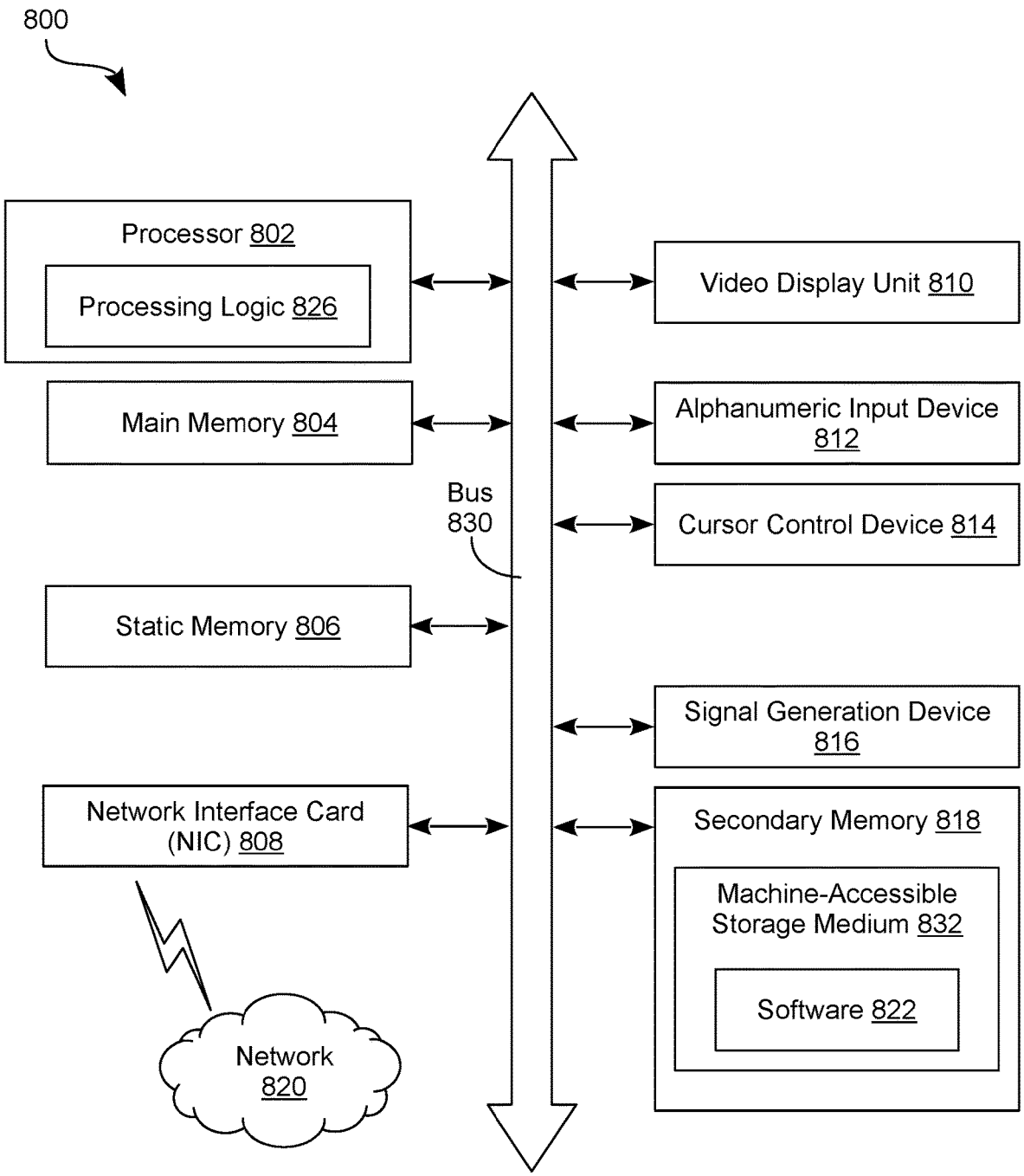
FIG. 8 illustrates a functional block diagram showing an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for managing power utilization by circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A system-on-chip (SOC) comprising:
first circuitry to:
receive first signals while the first circuitry is programmed based on multiple criteria which each correspond to a different respective power mode of multiple power modes of the SOC, wherein the first signals indicate a state of the SOC; and
concurrently perform multiple evaluations each based on the state of the SOC and a different respective criteria of the multiple criteria;
second circuitry coupled to receive respective results of the multiple evaluations in parallel from the first circuitry, the second circuitry to select a first power mode based on the results, wherein the second circuitry is to receive the respective results while the second circuitry is programmed with rank information which indicates a relative priorities of the multiple power modes with respect to each other, wherein the second circuitry is to select the first power mode further based on the relative priorities; and third circuitry, responsive to the second circuitry, to generate second signals to transition the SOC to the first power mode.

2. The SOC of claim 1, wherein the state comprises multiple conditions, wherein the first signals each correspond to a different respective condition of the multiple conditions, wherein the first circuitry comprises an array of circuit cells, and wherein the first circuitry is to receive first signals while the first circuitry is programmed to correspond circuit cells of the array each to a different respective combination of a test condition and one of the multiple conditions.

3. The SOC of claim 2, wherein rows of the array each correspond to a different respective criteria of the multiple criteria, and wherein columns of the array each correspond to a different respective condition of the multiple conditions.

4. The SOC of claim 2, wherein a first cell of the array is to be programmed, comprising the first cell to provide a selection of one of:
a first mode to provide a multi-bit evaluation functionality of the first cell;
a second mode to provide a single-bit evaluation functionality of the first cell; or
a third mode to disable both the multi-bit evaluation functionality and the single-bit evaluation functionality.

5. The SOC of claim 1, wherein the first circuitry is to be reprogrammed with updated criteria information.

6. The SOC of claim 1, further comprising fourth circuitry to:
receive sensor signals while the fourth circuitry is programmed with a definition of a format of the first signals; and
generate the first signals based on the sensor signals and the definition of the format.

7. The SOC of claim 1, wherein the results are to identify a plurality of power modes as candidate power modes, wherein the second circuitry is to select the first power mode based on a determination that, of the candidate power modes, the first power mode is a highest priority power mode.

8. The SOC of claim 1, wherein the third circuitry is to be programmed with mode transition information which indicates action sequences each to transition to a respective power mode, wherein the second signals are generated based on the mode transition information.

9. The SOC of claim 1, wherein the first circuitry is coupled to be programmed with a Basic Input/Output System process of the SOC.

10. A system comprising:
an integrated circuit (IC) comprising:
first circuitry to:
receive first signals while the first circuitry is programmed based on multiple criteria which each correspond to a different respective power mode of multiple power modes of the IC, wherein the first signals indicate a state of the IC; and
concurrently perform multiple evaluations each based on the state of the IC and a different respective criteria of the multiple criteria;
second circuitry coupled to receive respective results of the multiple evaluations in parallel from the first circuitry, the second circuitry to select a first power mode based on the results, wherein the second circuitry is to receive the respective results while the second circuitry is programmed with rank information which indicates a relative priorities of the multiple power modes with respect to each other, wherein the second circuitry is to select the first power mode further based on the relative priorities; and
third circuitry, responsive to the second circuitry, to generate second signals to transition the IC to the first power mode; and
a display device coupled to the IC, the display device to display an image based on data communicated with the IC.

11. The system of claim 10, wherein the state comprises multiple conditions, wherein the first signals each correspond to a different respective condition of the multiple conditions, wherein the first circuitry comprises an array of circuit cells, and wherein the first circuitry is to receive first signals while the first circuitry is programmed to correspond circuit cells of the array each to a different respective combination of a test condition and one of the multiple conditions.

12. The system of claim 11, wherein rows of the array each correspond to a different respective criteria of the multiple criteria, and wherein columns of the array each correspond to a different respective condition of the multiple conditions.

13. The system of claim 11, wherein a first cell of the array is to be programmed, comprising the first cell to provide a selection of one of:
a first mode to provide a multi-bit evaluation functionality of the first cell;
a second mode to provide a single-bit evaluation functionality of the first cell; or
a third mode to disable both the multi-bit evaluation functionality and the single-bit evaluation functionality.

14. The system of claim 10, wherein the IC further comprises fourth circuitry to:
receive sensor signals while the fourth circuitry is programmed with a definition of a format of the first signals; and
generate the first signals based on the sensor signals and the definition of the format.

15. A system-on-chip (SOC) comprising:
an array of circuit cells, the array comprising:
columns which are coupled each to receive a different respective one of first signals which indicate a state of the SOC;
rows to receive a programming which corresponds the rows each to a different respective criterion of multiple criteria which each correspond to a different respective power mode of the SOC, wherein, for each of the rows:
cells of the row are operable each based on a different respective test condition of the corresponding criterion; and
the row is to perform a respective evaluation based on the state of the SOC and the corresponding criterion;
first circuitry coupled to receive evaluation results each from a different respective row of the array, the first circuitry to select a first power mode based on the evaluation results, wherein the first circuitry to select the first power mode based on the evaluation results comprises the first circuitry to identify a plurality of power modes as candidate power modes, and to select the first power mode based on a determination that, of the candidate power modes, the first power mode is a highest priority power mode; and second circuitry to provide the first power mode responsive to the first circuitry.

16. The SOC of claim 15, wherein a first cell of the array is operable to select any of:
a first mode wherein a multi-bit evaluation functionality of the first cell is enabled;
a second mode wherein a single-bit evaluation functionality of the first cell is enabled; or
a third mode wherein both the multi-bit evaluation functionality and the single-bit evaluation functionality are disabled.

17. The SOC of claim 15, further comprising third circuitry which is to:
receive a programming based on a definition of a signal format; and
based on the programming, to generate the first signals according to the signal format.

* * * * *